(12) United States Patent
Ozawa et al.

(10) Patent No.: US 8,676,747 B2
(45) Date of Patent: Mar. 18, 2014

(54) DOCUMENT MANAGEMENT APPARATUS, DOCUMENT MANAGEMENT METHOD, AND COMPUTER-READABLE NON-TRANSITORY STORAGE MEDIUM STORING DOCUMENT MANAGEMENT PROGRAM

(75) Inventors: Kaitaku Ozawa, Itami (JP); Hiroaki Kubo, Muko (JP); Jun Kunioka, Kawanishi (JP); Ayumi Itoh, Ikoma-gun (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/051,740

(22) Filed: Mar. 18, 2011

(65) Prior Publication Data

US 2011/0238617 A1 Sep. 29, 2011

(30) Foreign Application Priority Data

Mar. 23, 2010 (JP) ................. 2010-066702

(51) Int. Cl.
*G06F 17/30* (2006.01)
(52) U.S. Cl.
USPC ........................................ 707/608
(58) Field of Classification Search
USPC ........................................ 707/608
See application file for complete search history.

(56) References Cited

U.S. PATENT DOCUMENTS

| | | | | |
|---|---|---|---|---|
| 7,698,316 | B2* | 4/2010 | Song et al. | 707/608 |
| 2004/0059922 | A1* | 3/2004 | Harris et al. | 713/186 |
| 2004/0261009 | A1 | 12/2004 | Torigoe et al. | |
| 2006/0136510 | A1 | 6/2006 | Voronov et al. | |
| 2006/0259524 | A1* | 11/2006 | Horton | 707/201 |
| 2007/0206739 | A1* | 9/2007 | Livengood et al. | 379/100.01 |
| 2009/0089064 | A1* | 4/2009 | Bachleda et al. | 704/275 |
| 2010/0161993 | A1* | 6/2010 | Mayer | 713/178 |

FOREIGN PATENT DOCUMENTS

| | | |
|---|---|---|
| JP | 2002-373110 | 12/2002 |
| JP | 2004-86851 | 3/2004 |
| JP | 2006-172453 | 6/2006 |
| JP | 2007-122135 | 5/2007 |
| JP | 2007-207271 | 8/2007 |

OTHER PUBLICATIONS

Notice of Ground of Rejection issued Jan. 24, 2012, directed to Japanese Application No. 2010-066702; 7 pages.

Komatsubara, K. (2000). "E-mail Notification of Changed Web Page with Advanced Setting by Numbers and Keywords," *Nikkei Internet Technology*. 38:122-125.

\* cited by examiner

*Primary Examiner* — Sheree Brown
(74) *Attorney, Agent, or Firm* — Morrison & Foerster LLP

(57) ABSTRACT

A document management apparatus includes a document storing portion to store a document, a designated part accepting portion to accept any part designated by a user within the stored document as a designated part, an associating portion to associate the accepted designated part with a notification destination, an altering portion to alter the stored document, and a notifying portion to notify the notification destination associated with the designated part when at least a portion of an altered part altered within the stored document by the altering portion is included in the designated part.

9 Claims, 8 Drawing Sheets

F I G. 2
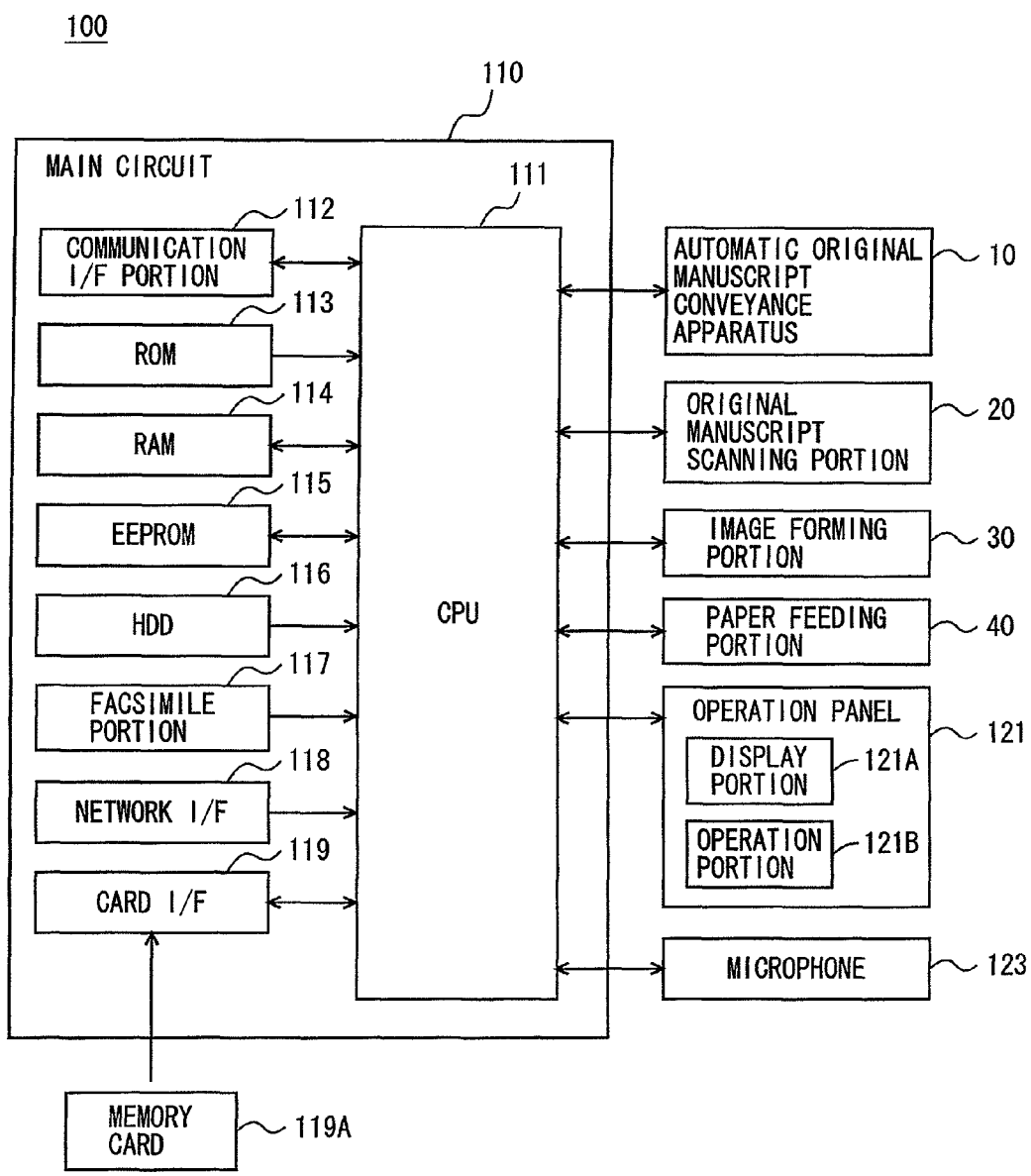

| DESIGNATED PART | | NOTIFICATION DESTINATION | ALTERATION LEVEL (NUMBER OF CHARACTERS) |
|---|---|---|---|
| FILE NAME | RANGE INFORMATION | | |
| DOCUMENT A | page 2 | ozawa@mail.com | 10 CHARACTERS |
| DOCUMENT A | page 2, page 3 | yamada@mail.com | 50 CHARACTERS |
| DOCUMENT B | NUMERIC VALUE (5000 YEN) | tanaka@mail.com | ONE CHARACTER |
| DOCUMENT C | pages 2, 3, 4 | ozawa@mail.com yamada@mail.com | 100 CHARACTERS |

F I G. 6

161

| USER NAME | NOTIFICATION DESTINATION | |
|---|---|---|
| Ozawa | ozawa@mail.com | 243 |
| Yamada | yamada@mail.com | 245 |
| Tanaka | tanaka@mail.com | 247 |
| Ozawa | ozawa@mail.com<br>yamada@mail.com | 249 |

F I G. 7

165

| | FILE NAME | STATUS |
|---|---|---|
| 261 | DOCUMENT A | PROPOSAL |
| 263 | DOCUMENT B | APPROVED BY SECTION HEAD |
| 265 | DOCUMENT C | APPROVED BY DIVISION HEAD |

DOCUMENT MANAGEMENT APPARATUS, DOCUMENT MANAGEMENT METHOD, AND COMPUTER-READABLE NON-TRANSITORY STORAGE MEDIUM STORING DOCUMENT MANAGEMENT PROGRAM

This application is based on Japanese Patent Application No. 2010-066702 filed with Japan Patent Office on Mar. 23, 2010, the entire content of which is hereby incorporated by reference.

BACKGROUND OF THE INVENTION

1. Field of the Invention

The present invention relates to a document management apparatus, a document management method, and a document management program, and more specifically to a document management apparatus that notifies an alteration within a document, a document management method executed by the document management apparatus, and a computer-readable storage medium storing the document management program.

2. Description of the Related Art

In a case where a document is shared by a plurality of people using a file server and the like, when a user alters the document, there is the need to notify other users of the fact that the document has been altered or of the content of the alteration. Japanese Patent Laid-Open No. 2006-172453 describes a computer implemented method for tracking a modification done to a document, characterized in that it includes creating an alteration list associated with an object included in the document, determining when the object is modified, storing information associated with the modified object within the alteration list, and notifying a user that the object has been modified.

The conventional computer implemented method for tracking a modification done to a document, however, has a problem in that the notification to the user can be done only per predetermined object since the objects included in the document are predetermined. One user may desire to be notified when an alteration has been made in a range smaller than an object, while another user may desire to be notified when an alteration has been made in a range larger than an object.

SUMMARY OF THE INVENTION

The present invention is made to solve the above-described problem, and an object of the present invention is to provide a document management apparatus capable of notifying only in the case where a part related to a user is altered within a document.

Another object of the present invention is to provide a document management method capable of notifying only in the case where a part related to a user is altered within a document.

Still another object of the present invention is to provide a document management program capable of notifying only in the case where a part related to a user is altered within a document.

The present invention is made to solve the above-described problem, and according to one aspect of the present invention, a document management apparatus includes a document storing portion to store a document, a designated part accepting portion to accept any part designated by a user within the stored document as a designated part, an associating portion to associate the accepted designated part with a notification destination, an altering portion to alter the stored document, and a notifying portion to notify the notification destination associated with the designated part when at least a portion of an altered part altered by the altering portion within the stored document is included in the designated part.

According to another aspect of the present invention, a document management method includes the steps of storing a document, accepting any part designated by a user within the stored document as a designated part, associating the accepted designated part with a notification destination, altering the stored document, and notifying the notification destination associated with the designated part when at least a portion of an altered part altered within the stored document is included in the designated part.

According to a still another aspect of the present invention, in a computer-readable non-transitory storage medium storing a document management program, the document management program causes a computer to execute the steps of storing a document, accepting any part designated by a user within the stored document as a designated part, associating the accepted designated part with a notification destination, altering the stored document, and notifying the notification destination associated with the designated part when at least a portion of an altered part altered within the stored document is included in the designated part.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing one example of a hardware arrangement of an MFP (Multi Function Peripheral).

FIG. 6 is a diagram showing one example of an address book.

FIG. 7 is a diagram showing one example of a status table.

DESCRIPTION OF THE PREFERRED EMBODIMENT

Figure 1:
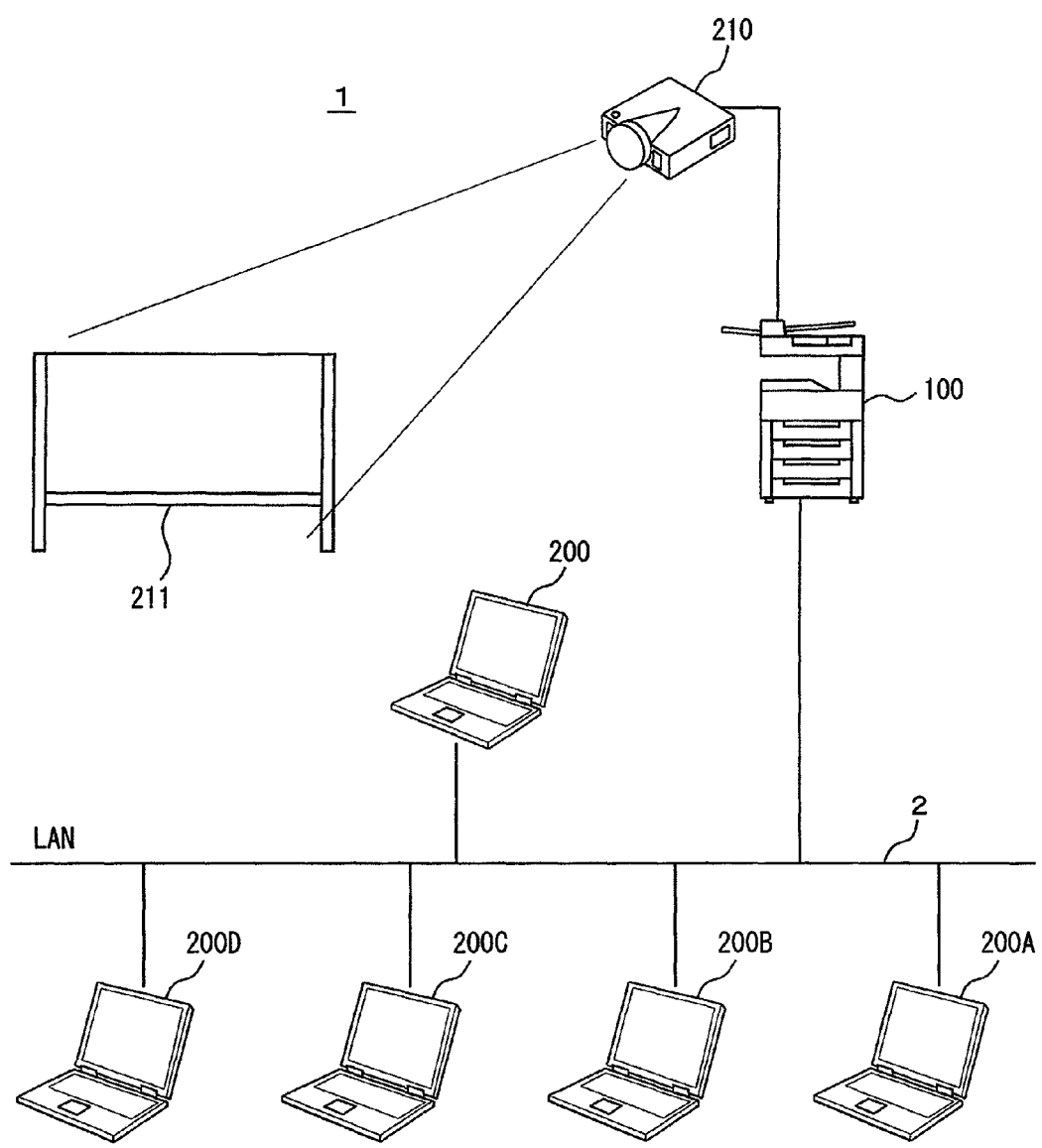
FIG. 1 is a diagram illustrating an example of a conference system in one embodiment of the present invention.

An embodiment of the present invention will be described below with reference to the drawings. In the following description, the same or corresponding parts are denoted by the same reference characters. Their names and function are also the same. Thus, the detailed description thereof will not be repeated.

FIG. 1 is a diagram illustrating an example of a conference system in one embodiment of the present invention. With reference to FIG. 1, a conference system 1 includes an MFP 100, PC 200, PCs 200A to 200D, a projector 210, and a whiteboard 211. MFP 100, PC 200, PCs 200A to 200D, and projector 210 are connected to a local area network (hereinafter referred to as a "LAN") 2.

MFP 100 is an example of a document management apparatus and is provided with a plurality of functions such as a scanner function, a printer function, a copying function, and a facsimile function in addition to a document management function. MFP 100 is capable of communicating with projector 210, PC 200, and PCs 200A to 200D via LAN 2. Moreover, although the example in which MFP 100, PC 200, PCs 200A to 200D, and projector 210 are connected via LAN 2 is illustrated, as long as communication is made possible, they may be connected by a serial communication cable or be connected by a parallel communication cable. In addition, the mode of communication is not limited to wired communication but it may also be wireless.

In conference system 1 according to the present embodiment, a presenter of a conference stores a document that is the material for the presentation in MFP 100. The document need only be data that can be displayed on a computer: for instance, an image, a character, a graph, or data which is a combination of these.

MFP 100 functions as a display control apparatus by controlling projector 210 and causing projector 210 to project an image of at least a portion of the document, thereby causing the image to be displayed on whiteboard 211. More specifically, MFP 100 takes at least a portion of the document as the part for display, transmits an image of the part for display to projector 210 as a display image, and causes projector 210 to display the display image. The size of the display image is the same as that of an image that the projector is capable of displaying. Thus, in the case where the entire document is larger in size than the display image, a portion of the document is set as the part for display, whereas in the case where the entire document is smaller in size than the display image, the entire document is set as the part for display.

Moreover, the document may be transmitted from MFP 100 to projector 210 beforehand, and the display image may be displayed on projector 210 by operating projector 210 from MFP 100 by remote control. Also in such a case, at least a portion of the document is set as the part for display, and the display image of the part for display of the document is displayed. The format of the display image transmitted from MFP 100 to projector 210 is not limited as long as projector 210 can receive and interpret the display image.

Projector 210 is provided with a liquid crystal display device, a lens, and a light source, and projects the display image received from MFP 100 onto a drawing surface of whiteboard 211. The liquid crystal display device displays the display image, and the light emitted from the light source transmits through the liquid crystal display device and is irradiated on whiteboard 211 via the lens. When the light irradiated from projector 210 is irradiated on the drawing surface of whiteboard 211, a display image which is an enlargement of the display image displayed on the liquid crystal display device is shown on the drawing surface. Here, the drawing surface of whiteboard 211 is used as a projection plane onto which projector 210 projects the display image.

PC 200 and PCs 200A to 200D are common computers, and the hardware arrangements and the functions thereof are well known so that the description will not be repeated here. Here, MFP 100 transmits the same display image as the one displayed by projector 210 to PC 200 and PCs 200A to 200D. Consequently, the same display image as the one displayed on whiteboard 211 is displayed on the respective displays of PC 200 and PCs 200A to 200D. Thus, users of PC 200 and PCs 200A to 200D may confirm the progression of the conference while viewing the display image displayed on any one of the displays of PC 200 and PCs 200A to 200D or whiteboard 211.

In addition, PC 200 and PCs 200A to 200D are capable of accessing a hard disk drive (HDD) 116 (see FIG. 2) provided in MFP 100, and they download the document stored in HDD 116 and display an image of the downloaded document.

FIG. 2 is a block diagram showing one example of a hardware arrangement of an MFP. With reference to FIG. 2, MFP 100 includes a main circuit 110, an original manuscript scanning portion 20 to scan a sheet of an original manuscript, an automatic original manuscript conveyance apparatus 10 to convey the sheet of the original manuscript to original manuscript scanning portion 20, an image forming portion 30 to form on a sheet of paper and the like a still image outputted by original manuscript scanning portion 20 after it scans the sheet of the original manuscript, a paper feeding portion 40 to supply a sheet of paper to image forming portion 30, an operation panel 121 to serve as a user interface, and a microphone 123 to collect sound.

Main circuit 110 includes a CPU 111, a communication interface (I/F) portion 112, a ROM (Read Only Memory) 113, a RAM (Random Access Memory) 114, an EEPROM (Electrically Erasable Programmable ROM) 115, a hard disk drive (HDD) 116 serving as a mass storage device, a facsimile portion 117, a network interface (I/F) 118, and a card interface (I/F) 119 to which a memory card 119A is attached. CPU 111 is connected to automatic original manuscript conveyance apparatus 10, original manuscript scanning portion 20, image forming portion 30, paper feeding portion 40, and operation panel 121 and controls the entire MFP 100.

ROM 113 stores a program to be executed by CPU 111 and the data required for execution of that program. RAM 114 is used as a work area when CPU 111 executes a program.

Operation panel 121 is provided on a top surface of MFP 100 and includes a display portion 121A and an operation portion 121B. Display portion 121A is a display device such as a liquid crystal display device or an organic ELD (Electro Luminescence Display), and displays an instruction menu for the user, information related to obtained display data, and the like. Operation portion 121B is provided with a plurality of keys, and accepts input of data such as a number, a character, and a variety of instructions given by user operation corresponding to the keys. Operation portion 121B further includes a touch panel provided on display portion 121A.

Communication I/F portion 112 is an interface for connecting MFP 100 to other apparatuses via a serial communication cable. Moreover, the mode of communication may be wired or wireless.

Facsimile portion 117 is connected to a public switched telephone network (PSTN), and transmits facsimile data to the PSTN or receives facsimile data from the PSTN. Facsimile portion 117 stores the received facsimile data in HDD 116 or outputs it to image forming portion 30. Image forming portion 30 prints the facsimile data received by facsimile portion 117 onto a sheet of paper. Moreover, facsimile portion 117 converts the data stored in HDD 116 into facsimile data and transmits the converted data to a facsimile machine connected to the PSTN.

Network I/F 118 is an interface for connecting MFP 100 to LAN 2. CPU 111 is capable of communicating with PC 200, PCs 200A to 200D and projector 210 connected to LAN 2 via network I/F 118. In addition, in the case where LAN 2 is connected to the Internet, CPU 111 is capable of communicating with a computer connected to the Internet. A computer connected to the Internet includes an electronic mail server that transmits and receives an electronic mail. Network I/F 118 may be connected not only to LAN 2 but also to the Internet, a wide area network (WAN), the public switched telephone network, and the like.

Microphone 123 collects sound and outputs the collected sound to CPU 111. Here, MFP 100 is set up in a conference room, and microphone 123 collects the sounds in the conference room. Moreover, microphone 123 may be connected to MFP 100 via wire or wireless connection, and the presenter or an attendant in the conference room may input the voice into microphone 123. In such a case, it is not necessary to set up MFP 100 in the conference room.

Card I/F 119 has memory card 119A attached thereto. CPU 111 is capable of accessing memory card 119A via card I/F 119 and is capable of loading a program stored in memory card 119A into RAM 114 and executing it. Moreover, the program to be executed by CPU 111 is not limited to the program stored in memory card 119A and may be a program stored in other storage media. The program may be a program stored in HDD 116, and further, it may be a program written into HDD 116 by another computer connected to LAN 2 via communication I/F portion 112.

Moreover, the storage media for storing the program is not limited to memory card 119A and may also be an optical disk [MO (Magnetic Optical Disc)/MD (Mini Disc)/DVD (Digital Versatile Disc)], an IC card, an optical card, or a semiconductor memory such as a mask ROM, an EPROM (Erasable Programmable ROM), and an EEPROM (Electrically Erasable Programmable ROM).

The program referred to herein includes not only a program directly executable by CPU 111 but also a source program, a compressed program, an encrypted program, and the like.

Figure 3:
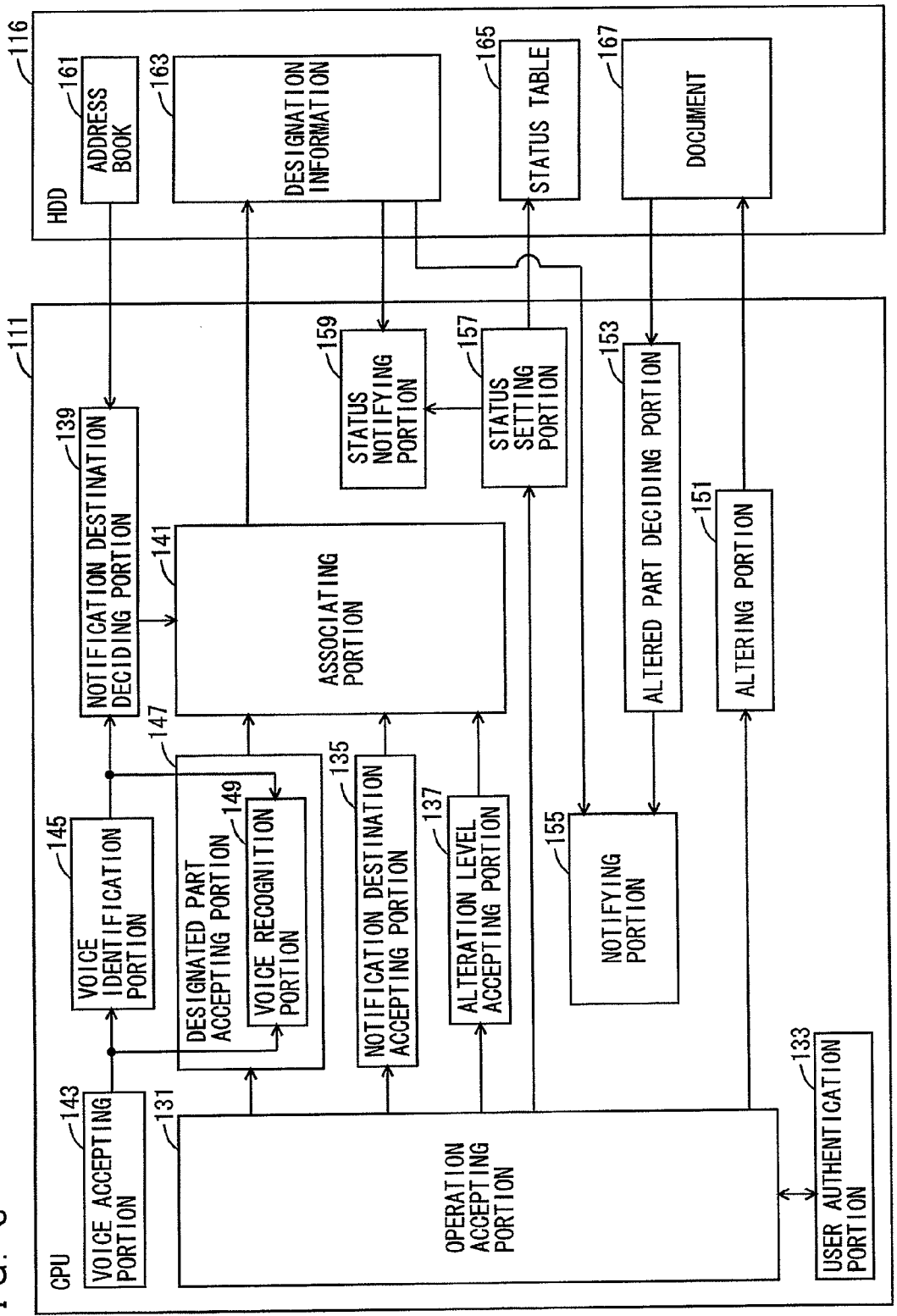
FIG. 3 is a block diagram showing an overview of functions configured in a CPU (Central Processing Unit) provided in the MFP along with data stored in an HDD (Hard Disk Drive).

FIG. 3 is a block diagram showing an overview of functions configured in a CPU provided in an MFP along with data stored in an HDD. The functions shown in FIG. 3 are realized by CPU 111 provided in MFP 100 executing a document management program stored in ROM 113 or in memory card 119A.

With reference to FIG. 3, CPU 111 includes an operation accepting portion 131 to accept an operation of a user, a user authentication portion 133 to authenticate the user, a notification destination accepting portion 135 to accept a notification destination, an alteration level accepting portion 137 to accept an alteration level, a notification destination deciding portion 139 to decide the notification destination, an associating portion 141 to associate a designated part within a document with the notification destination, a voice accepting portion 143 to accept a voice, a voice identification portion 145 to identify the voice, an altering portion 151 to alter the document, an altered part deciding portion 153 to decide an altered part within the document, a notifying portion 155 to notify of an alteration, a status setting portion 157 to set a status of the document, and a status notifying portion 159 to notify the status that has been set.

In HDD 116, an address book 161, designation information 163, a status table 165, and a document 167 are stored. Address book 161 includes a notification destination record that includes user identification information and notification destination information. The user identification information is a name assigned to a user for identifying that user, and the notification destination information is an electronic mail address assigned to that user. In the present embodiment, when a window for creating an address book is displayed on display portion 121A and the user inputs the name and the electronic mail address into operation portion 121B, the notification destination record that includes the name and the electronic mail address inputted is additionally stored in address book 161.

Designation information 163 is information that associates a designated part with notification destination information. The designated part includes a file name for identifying document 167 stored in HDD 116 and range information for specifying the part within document 167 identified by the file name. Here, designation information 163 includes a designation record for each designated part. The designation record includes the file name, the range information, and the notification destination information. The range information only needs to be the information that specifies a portion within document 167, and for instance, if document 167 has a plurality of pages, the range information is represented by a page number, and if a page has a plurality of lines, it is represented by a line number. In addition, the range information may be represented by a numeric value or a character string within the document. If document 167 is divided into a plurality of chapters or the like, the range information may be represented by a chapter number. Moreover, a page number, a line number, and a chapter number may be combined. Furthermore, the entire document 167 may be indicated by a coordinate system, and the range information of a portion within document 167 may be represented by a coordinate value.

Status table 165 includes a status record that associates the file name for identifying document 167 and status information indicating a status of document 167. While the status information is different for each document 167, the example will be described in which the document is a proposal documentation material created by a company employee. A proposal documentation material, after it is created, is approved by a section head, and then is approved by a division head. The status information with regard to this proposal documentation material include "proposal" which indicates the status that the proposal documentation material has been created, "approved by section head" which indicates the status of having been approved by the section head, and "approved by division head" which indicates the status of having been approved by the division head. Document 167 is the data stored in HDD 116 according to an instruction given by a user. For instance, document 167 includes data created by an application program executed by PC 200 and PCs 200A to 200D, image data obtained by MFP 100 when original manuscript scanning portion 20 scans a sheet of an original manuscript, facsimile data received by facsimile portion 117, and data downloaded by network I/F 118 from an external computer such as a Web server.

Operation accepting portion 131 displays an operation window on display portion 121A and accepts the operation inputted into operation portion 121B by a user. In addition, in the case where the user operates MFP 100 by remote control using one of PC 200 and PCs 200A to 200D, the user displays the operation window on a display of one of PC 200 and PCs 200A to 200D, and the operation inputted by the user into one of PC 200 and PCs 200A to 200D is accepted. For instance, in the case where the user operates MFP 100 by remote control using PC 200, when operation accepting portion 131 transmits a window to PC 200 via network I/F 118, the window is displayed on the display provided to PC 200. Moreover, if the user inputs the operation into a keyboard or a mouse provided to PC 200, PC 200 transmits the inputted operation to MFP 100. When network I/F 118 receives the operation transmitted from PC 200, operation accepting portion 131 accepts the operation from network I/F 118.

Unless otherwise noted, the case in which a user operates MFP 100 by remote control using PC 200 will be described below as an example.

User authentication portion 133 authenticates the user that operates MFP 100. When the user inputs a set of a user ID and a password into PC 200, PC 200 transmits the inputted set of the user ID and the password to MFP 100. When network I/F 118 of MFP 100 receives the set of the user ID and the password transmitted from PC 200, user authentication portion 133 compares the received set of the user ID and the password with the sets of the user IDs and the passwords stored in advance. If the set that matches exists, the user operating PC 200 is authenticated, but if a matching set does not exist, no authentication takes place. When the user is authenticated, user authentication portion 133 treats the operations inputted thereafter as those inputted by the authenticated user.

Upon accepting an instruction to set the designation information from PC 200, operation accepting portion 131 transmits a setting window to PC 200 via network I/F 118. In PC 200, the received setting window is displayed on the display. The setting window is the window for setting the designation information.

Figures 4, 5:
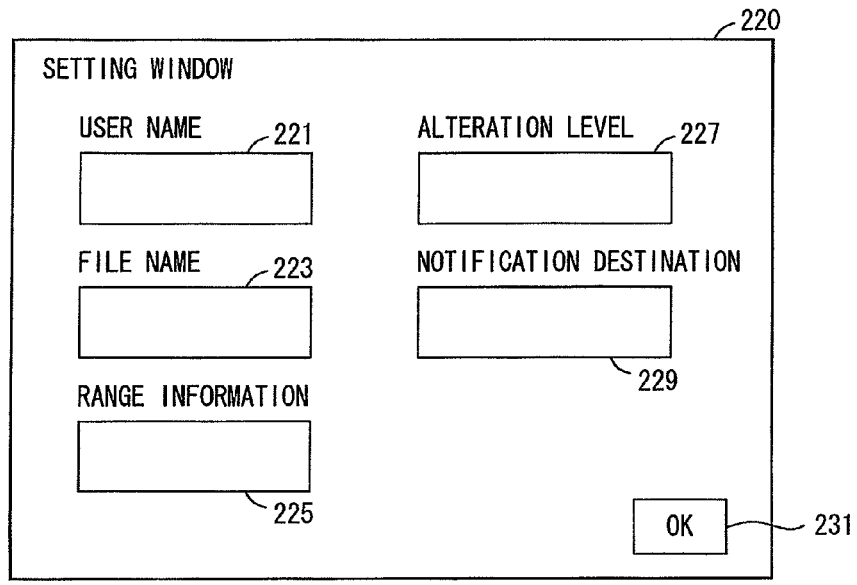
FIG. 4 is a diagram showing one example of a setting window.
FIG. 5 is a diagram showing one example of designation information.

FIG. 4 is a diagram showing one example of the setting window. A setting window 220 includes an area 221 for inputting a user name, an area 223 for inputting a file name, an area 225 for inputting range information, an area 227 for inputting an alteration level, an area 229 for inputting a notification destination, and an OK button 231 displaying the character string of "OK." In area 221, the name of the user who has been authenticated by user authentication portion 133 is displayed. When the user inputs a file name into area 223 by instructing on operation portion 121B, the file name is displayed in area 223. In addition, area 223 has a command assigned thereto to transmit the inputted file name to MFP 100. When the user inputs the file name into area 223, PC 200 transmits the file name to MFP 100.

When network I/F 118 receives the file name from PC 200, operation accepting portion 131 of CPU 111 provided in MFP 100 reads the document specified by the file name from HDD 116 and transmits the read document to PC 200 via network I/F 118. Upon receiving document 167 from MFP 100, PC 200 displays the received document 167 on the display. Consequently, it becomes possible for the user to designate any portion within document 167. For instance, if the user uses a pointing device such as a mouse to designate by a drag-and-drop operation any rectangular portion within document 167 displayed on the display, a page number, a line number, or a character string itself contained in the rectangular portion would be inputted into PC 200 as the range information. In addition, the user may input a page number, a line number, or a character string itself using a keyboard provided to PC 200. When the range information is inputted, PC 200 displays the range information in area 225.

When the user inputs a number of characters in area 227 using the keyboard provided to PC 200, the number of characters is inputted into PC 200 as an alteration level. When the user inputs an electronic mail address into area 229 using the keyboard provided to PC 200, the electronic mail address is inputted into PC 200 as a notification destination.

When the user instructs on OK button 231 using the keyboard or a mouse provided to PC 200, the name of the user, the file name, the range information, the alteration level, and the notification destination inputted in area 221 to area 229 are transmitted to MFP 100.

Going back to FIG. 3, when network I/F 118 receives the name of the user, the file name, the range information, the alteration level, and the notification destination from PC 200 to which the setting window was transmitted, operation accepting portion 131 outputs the file name and the range information to a designated part accepting portion 147, the alteration level to alteration level accepting portion 137, and the notification destination to notification destination accepting portion 135.

When the file name and the range information are inputted from operation accepting portion 131, designated part accepting portion 147 outputs them to associating portion 141.

When the notification destination is inputted from operation accepting portion 131, notification destination accepting portion 135 outputs the electronic mail address to associating portion 141. When the alteration level is inputted from operation accepting portion 131, alteration level accepting portion 137 outputs the alteration level to associating portion 141.

Associating portion 141 associates the file name and the range information inputted from designated part accepting portion 147 with the notification destination inputted from notification destination accepting portion 135 and with the alteration level inputted from alteration level accepting portion 137. More specifically, associating portion 141 generates a designation record that includes the file name, the range information, the notification destination, and the alteration level, and stores the generated designation record additionally with designation information 163 of HDD 116.

FIG. 5 is a diagram showing one example of the designation information. Designation information 163 includes a designation record for each designated part. FIG. 5 illustrates the instance in which four designation records are included. The designation record includes the column of range information, the column of a notification destination, and the column of an alteration level. The file name is set in the column of a file name, the range information is set in the column of the range information, the notification destination is set in the column of the notification destination, and the alteration level is set in the column of the alteration level.

Going back to FIG. 3, associating portion 141 sets the file name inputted from designated part accepting portion 147 in the column of the file name of the designation record newly generated, sets the range information inputted from designated part accepting portion 147 in the column of the range information of the designation record, sets the notification destination inputted from notification destination accepting portion 135 in the column of the notification destination of the designation record, and sets the alteration level inputted from alteration level accepting portion 137 in the column of the alteration level of the designation record.

MFP 100 according to the present embodiment stores designation information 163 in HDD 116 during a presentation. In such a case, there are a presenter and an attendant, and the voices produced by the presenter and the attendant are accepted by microphone 123. By identifying the user from the voice, designation information 163 is stored in HDD 116. In this case, the presenter has been authenticated by user authentication portion 133, inputs the instruction to display document 167 stored in HDD 116 from operation portion 121B into MFP 100, and causes projector 210 to display an image of document 167.

When the instruction to display document 167 stored in HDD 116 is inputted into operation portion 121B, designated part accepting portion 147 reads the instructed document 167 from HDD 116, transmits it to projector 210 via network I/F 118, and causes projector 210 to display an image of document 167. Moreover, the user who is the presenter may log onto MFP 100 from PC 200 and control projector 210 by operating MFP 100 by remote control.

Voice accepting portion 143 accepts a voice inputted from microphone 123. Voice accepting portion 143 accepts the voice if a voice automatic trace function is set to ON. Here, the voice automatic trace function is set to either ON or OFF by the user presetting it in MFP 100. Voice accepting portion 143 outputs the accepted voice to voice identification portion 145 and designated part accepting portion 147.

Voice identification portion 145 identifies the user from the voice inputted from voice accepting portion 143. More specifically, voice identification portion 145 identifies the user who produced the voice by comparing voiceprints. Voice identification portion 145 stores the set of the voice of a user and the name of that user in advance in HDD 116, and identifies the user by extracting from HDD 116 the set that includes the same voiceprint as the voiceprint of the voice inputted from voice accepting portion 143. If the name of the user included in the set extracted by voice identification portion 145 matches the name of the user authenticated by user authentication portion 133, the voice inputted from voice accepting portion 143 is the voice of the user authenticated by user authentication portion 133, i.e. here, the voice of the presenter. In this case, voice identification portion 145 outputs the name of the user identified from the voice inputted from voice accepting portion 143 to designated part accepting portion 147. Conversely, if the name of the user included in the set extracted by voice identification portion 145 does not match the name of the user authenticated by user authentication portion 133, the voice inputted from voice accepting portion 143 is a voice of an attendant. In this case, voice identification portion 145 outputs the name of the user identified from the voice inputted from voice accepting portion 143 to notification destination deciding portion 139.

Designated part accepting portion 147 includes a voice recognition portion 149. Voice recognition portion 149 recognizes the voice inputted from voice accepting portion 143 and, more specifically, converts the inputted voice into character data by referring to the voice patterns stored in HDD 116 in advance.

Now, the presenter ordinarily speaks according to the display image projected on whiteboard 211. Consequently, it is highly likely that the part which includes a word spoken by the presenter is the part being discussed at that moment. Designated part accepting portion 147 sets as the designated range the portion that includes the part including the same character string as the character string in the voice recognized by voice recognition portion 149 and the part included in a predetermined range from that part within document 167 displayed on projector 210. Designated part accepting portion 147 outputs the file name of document 167 displayed on projector 210 and the designated range to associating portion 141.

In the case where the name of the user is inputted from voice identification portion 145, notification destination deciding portion 139 extracts from address book 161 stored in HDD 116 the notification destination record which has the inputted name set therein, and decides on the electronic mail address set in the column of the notification destination of the extracted notification destination record to be the notification destination. The case in which the name of the user is inputted into notification destination deciding portion 139 from voice identification portion 145 is the case where the user identified by voice identification portion 145 is an attendant.

FIG. 6 is a diagram showing one example of an address book. With reference to FIG. 6, address book 161 includes four notification destination records. The notification destination record includes the column of a user name and the column of a notification destination. The name of the user is set in the column of the user name, and an electronic mail address assigned to that user is set in the column of the notification destination.

Going back to FIG. 3, notification destination deciding portion 139 extracts from address book 161 the notification destination record that has the name of the attendant included in the set inputted from voice identification portion 145 set therein, and outputs the electronic mail address included in the extracted notification destination record to associating portion 141.

When an electronic mail address is inputted from notification destination deciding portion 139 as the notification destination, associating portion 141 associates that electronic mail address with the file name and the range information inputted from designated part accepting portion 147 and stores them in designation information 163. More specifically, the designation record in which the file name inputted from designated part accepting portion 147 is set in the column of the file name in the designation record, in which the range information inputted from designated part accepting portion 147 is set in the column of the range information, and in which the electronic mail address inputted from notification destination deciding portion 139 is set in the column of the notification destination, is stored additionally with designation information 163 stored in HDD 116.

The name of the user is inputted into notification destination deciding portion 139 from voice identification portion 145 when the user identified by voice identification portion 145 is an attendant. In this case, the voice accepted by voice accepting portion 143 is the voice produced by an attendant when the attendant spoke for the purpose of raising a question or discussion. Prior to this stage, the designated part which is currently the subject of discussion within document 167 displayed on projector 210 has already been decided in designated part accepting portion 147 based on the voice of the presenter. Thus, designation information 163 is automatically set such that the attendant who spoke for the purpose of raising a question or discussion would be notified of the alteration or of the content of the alteration when the designated part that is currently the subject of the discussion is altered.

Upon accepting an instruction to alter document 167 stored in HDD 116, operation accepting portion 131 outputs an alteration instruction to altering portion 151. An alteration instruction is, for instance, an instruction to overwrite document 167 stored in HDD 116 with an altered document. When the user creates the altered document on PC 200 and inputs the instruction to overwrite HDD 116, an overwrite command including the altered document is transmitted to MFP 100. When network I/F 118 receives the alteration instruction from PC 200, operation accepting portion 131 accepts the alteration instruction and outputs the accepted alteration instruction to altering portion 151. Moreover, the alteration instruction is accepted also in the case where the user operates operation portion 121B and alters document 167 stored in HDD 116 using an application program executed by CPU 111.

When the alteration instruction is inputted, altering portion 151 alters the document specified by the alteration instruction among documents 167 stored in HDD 116 using the altered document included in the alteration instruction.

Altered part deciding portion 153 decides the range of alteration that has been altered within the document based on the difference between the document prior to the alteration and the document after the alteration by altering portion 151. Altered part deciding portion 153 creates a backup of document 167 to be the subject of alteration before the document is altered by altering portion 151 and calculates the difference between the documents before and after the alteration. Altered part deciding portion 153 outputs to notifying portion 155 the altered part which includes the difference, the range of alteration, and the file name of document 167 that is the subject of the alteration.

In the case where the designated part including the altered part inputted from altered part deciding portion 153 is included in designation information 163, notifying portion 155 notifies the notification destination associated with that designated part. More specifically, when the altered part is inputted from altered part deciding portion 153, notifying portion 155 extracts from designation information 163 the designation record in which the same file name as the file name of that altered part is set in the column of the file name and in which the range information including the range of alteration of the altered part is set in the column of the range information. If the number of characters included in the difference included in the altered part is not less than the number of characters set in the column of the alteration level of the extracted designation record, notifying portion 155 generates an electronic mail whose destination is the electronic mail address set in the column of the notification destination of the extracted designation record and which includes the file name and the altered document 167. Notifying portion 155 transmits the generated electronic mail to an electronic mail server via network I/F 118.

Upon accepting a status alteration instruction for altering the status of the document from PC 200 via network I/F 118, operation accepting portion 131 outputs the status alteration instruction to status setting portion 157. The status alteration instruction includes the file name of the document and the altered status.

Status setting portion 157 updates status table 165 based on the status alteration instruction inputted from operation accepting portion 131.

FIG. 7 is a diagram showing one example of the status table. Status table 165 includes a status record. The status record includes the column of a file name and the column of a status. FIG. 7 shows three status records.

Going back to FIG. 3, when the status alteration instruction is inputted from operation accepting portion 131, status setting portion 157 extracts the status record in which the same file name as the file name included in the inputted status alteration instruction is set in the column of the file name, and updates the column of the status in the extracted status record with the altered status included in the status alteration instruction. Status setting portion 157 updates the status record and then outputs the status alteration instruction to status notifying portion 159.

Status notifying portion 159 notifies the fact that the status of the document has been altered. When the status alteration instruction is inputted from status setting portion 157, status notifying portion 159 extracts the designation record that includes the file name included in the status alteration instruction among designation information 163 stored in HDD 116. Status notifying portion 159 sets the electronic mail address included in the extracted designation record as the destination, generates an electronic mail which includes the status set in the column of the status of the status alteration instruction, and transmits the generated electronic mail to an electronic mail server via network I/F 118.

Figure 8:
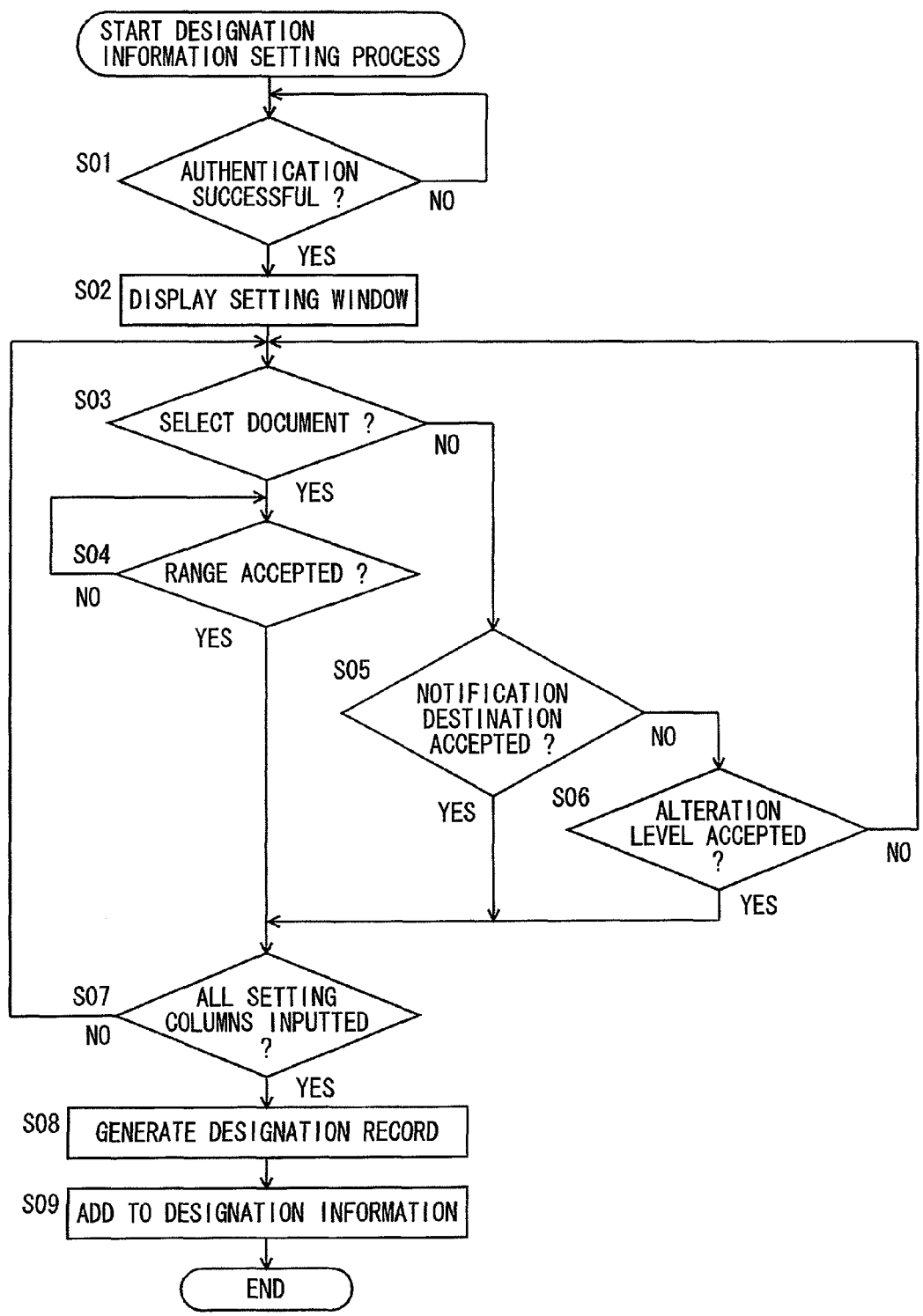
FIG. 8 is a flow chart showing one example of the flow of a designation information setting process.

FIG. 8 is a flow chart showing one example of the flow of a designation information setting process. The designation information setting process is the process executed by CPU 111 when CPU 111 provided in MFP 100 executes a document management program stored in ROM 113 or memory card 119A. With reference to FIG. 8, CPU 111 determines whether the authentication of a user has been successful or not (step S01). The process stands by until the authentication of the user is successful (NO in step S01), and it proceeds to step S02 when the authentication of the user succeeds (YES in step S01).

In step S02, a setting window is displayed, and the process proceeds to step S03. The setting window is the window for setting a file name, range information, an alteration level, and a notification destination. Here, the setting window shown in FIG. 4 is transmitted to PC 200 so that the setting window is displayed on the display of PC 200.

In step S03, it is determined whether the operation to select a document has been accepted or not. If the operation to select a document has been accepted, the process proceeds to step S04, but if not, the process proceeds to step S05. In step S04, it is determined whether the range indicating a portion within the document selected in step S03 has been accepted or not. The process stands by until the range is accepted (NO in step S04), and it proceeds to step S07 when the range has been accepted (YES in step S04).

In step S05, it is determined whether a notification destination has been accepted or not. If the notification destination has been accepted, the process proceeds to step S07, but if not, the process proceeds to step S06. In step S06, it is determined whether an alteration level has been accepted or not. If the alteration level has been accepted, the process proceeds to step S07, but if not, the process goes back to step S03. Moreover, in step S03, step S05, and step S06, no order of priority is set in accepting the inputs of the column of the document, the column of the notification destination, and the column of the alteration level so that any column may be inputted first.

In step S07, it is determined whether the inputs of all setting columns have been accepted or not. If the inputs of all the setting columns have been accepted, the process proceeds to step S08, but if not, the process goes back to step S03. All setting columns refer to the file name of the document selected in step S03, the range information accepted in step S04, the notification destination accepted in step S05, and the alteration level accepted in step S06. Moreover, although the process is allowed here to proceed to step S08 provided that all setting columns have been inputted, the process may be allowed to proceed to step S08 provided that at least the requisite columns are set. The requisite columns are the file name of the document selected in step S03, the range information accepted in step S04, and the notification destination accepted in step S05. Furthermore, if the data associating a user with a notification destination such as an address book is stored in advance, the notification destination associated with the user authenticated in step S01 can be set so that the notification destination is not a requisite column in this case.

In step S08, a designation record is generated, and the process proceeds to step S09. More specifically, the designation record is generated in which the file name of the document selected in step S03 is set in the column of the file name, the range accepted in step S04 is set in the column of the range information, the notification destination accepted in step S05 is set in the column of the notification destination, and the alteration level accepted in step S06 is set in the column of the alteration level.

In step S09, the designation record generated in step S08 is added to designation information 163 stored in HDD 116, and the designation information setting process is terminated.

Figure 9:
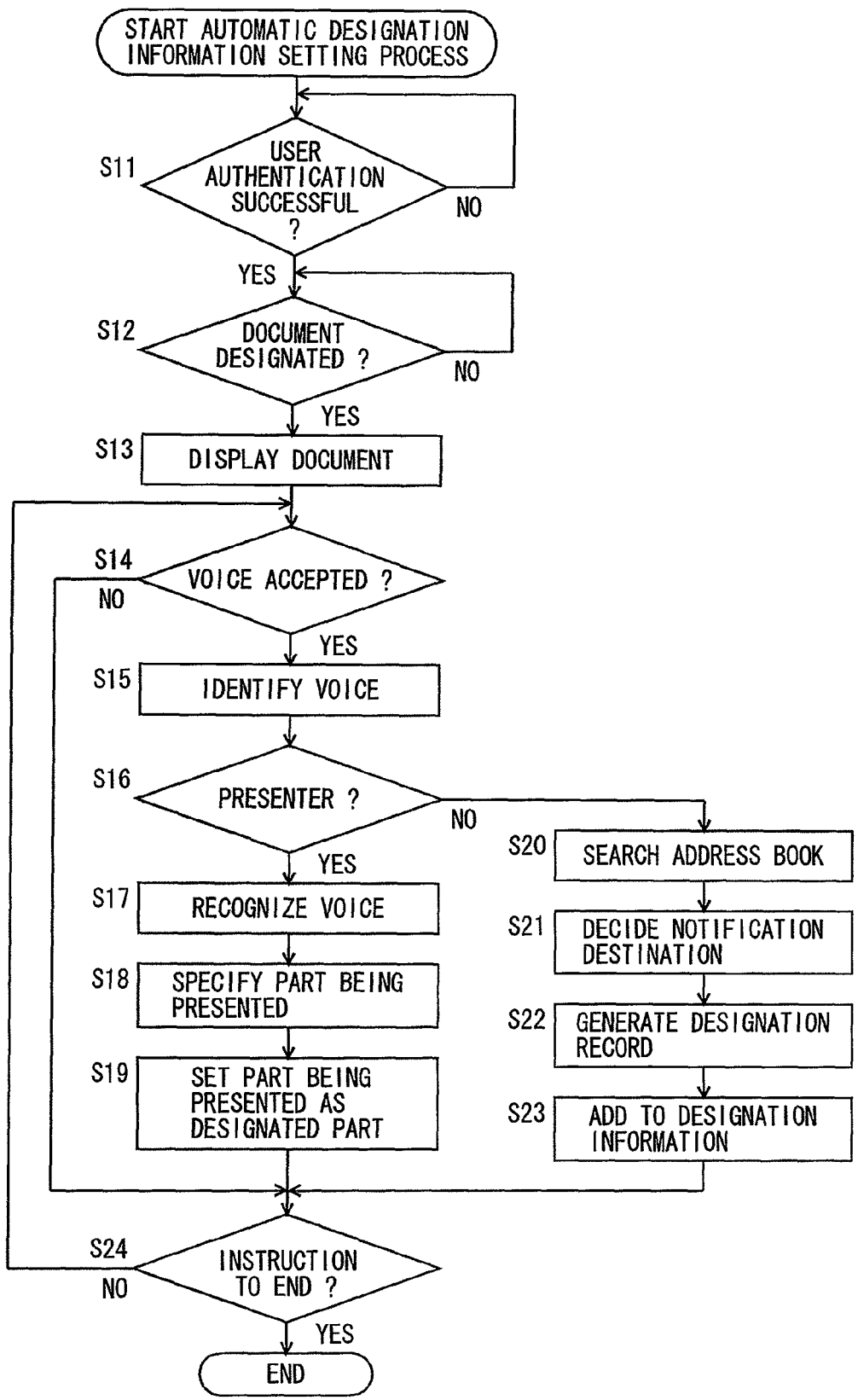
FIG. 9 is a flow chart showing one example of the flow of an automatic designation information setting process.

FIG. 9 is a flow chart showing one example of the flow of an automatic designation information setting process. An automatic designation information setting process is the process executed by CPU 111 when CPU 111 provided in MFP 100 executes a document management program stored in ROM 113 or memory card 119A. With reference to FIG. 9, CPU 111 determines whether the authentication of a user has been successful or not (step S11). The process stands by until the authentication of the user is successful (NO in step S11), and it proceeds to step S12 when the authentication of the user succeeds (YES in step S11). Here, the user to be authenticated is the presenter at the conference.

In step S12, it is determined whether a document has been designated or not. The process stands by until the document is designated (NO in step S12), and it proceeds to step S13 if one of documents 167 stored in HDD 116 has been designated (YES in step S12).

In step S13, document 167 designated in step S12 is read from HDD 116 and the read document 167 is displayed by projector 210. In the next step S14, it is determined whether a voice has been accepted or not. If a voice has been accepted, the process proceeds to step S15, but if not, the process proceeds to step S24.

In step S15, voice identification is performed based on the voice accepted in step S14, and the process proceeds to step S16. More specifically, from the accepted voice, the user who produced that voice is identified. The user is identified by using the set of the voiceprint of the user and the name of that user stored in advance in HDD 116 and extracting the set that includes the same voiceprint as the voiceprint of the voice accepted in step S14.

In step S16, it is determined whether the user identified in step S15 is the presenter or not. If the identified user is the presenter, the process proceeds to step S17, but if not, the process proceeds to step S20.

In step S17, the voice accepted in step S14 is recognized, and the process proceeds to step S18. In step S18, the part being presented is specified based on a character string obtained by the voice recognition done in step S17. More specifically, a search is done for a character string that matches the character string obtained by the voice recognition within document 167 designated in step S12, and the portion including the character string that matches the character string obtained by the voice recognition is specified to be the part being presented.

In the next step S19, the part being presented specified in step S18 is set to be the designated part, and the process proceeds to step S24. More specifically, the file name of document 167 designated in step S12 and the range information of the part being presented are set to be the designated part. Moreover, the process of step S14 through step S24 is repeated until an end instruction is accepted in step S24.

The process proceeds to step S20 when the voice identified in step S15 is the voice of an attendant. In step S20, address book 161 is searched, and the process proceeds to step S21. More specifically, the notification destination record which includes the name of the user identified in step S15 is extracted from the notification destination records included in address book 161.

In the next step S21, the notification destination is decided, and the process proceeds to step S22. The electronic mail address set in the column of the notification destination of the notification destination record extracted in step S20 is decided to be the notification destination.

In step S22, a designation record is generated, and the process proceeds to step S23. More specifically, the designation record is generated in which the range information specified by the designated part set in step S19 is set in the column of the range information and in which the electronic mail address decided in step S21 is set in the column of the notification destination.

In step S23, the designation record generated in step S22 is stored additionally with designation information 163 stored in HDD 116, and the process proceeds to step S24.

In step S24, it is determined whether the end instruction has been accepted or not. If the end instruction has been accepted, the automatic designation information setting process is terminated, but if not, the process goes back to step S14.

Figure 10:
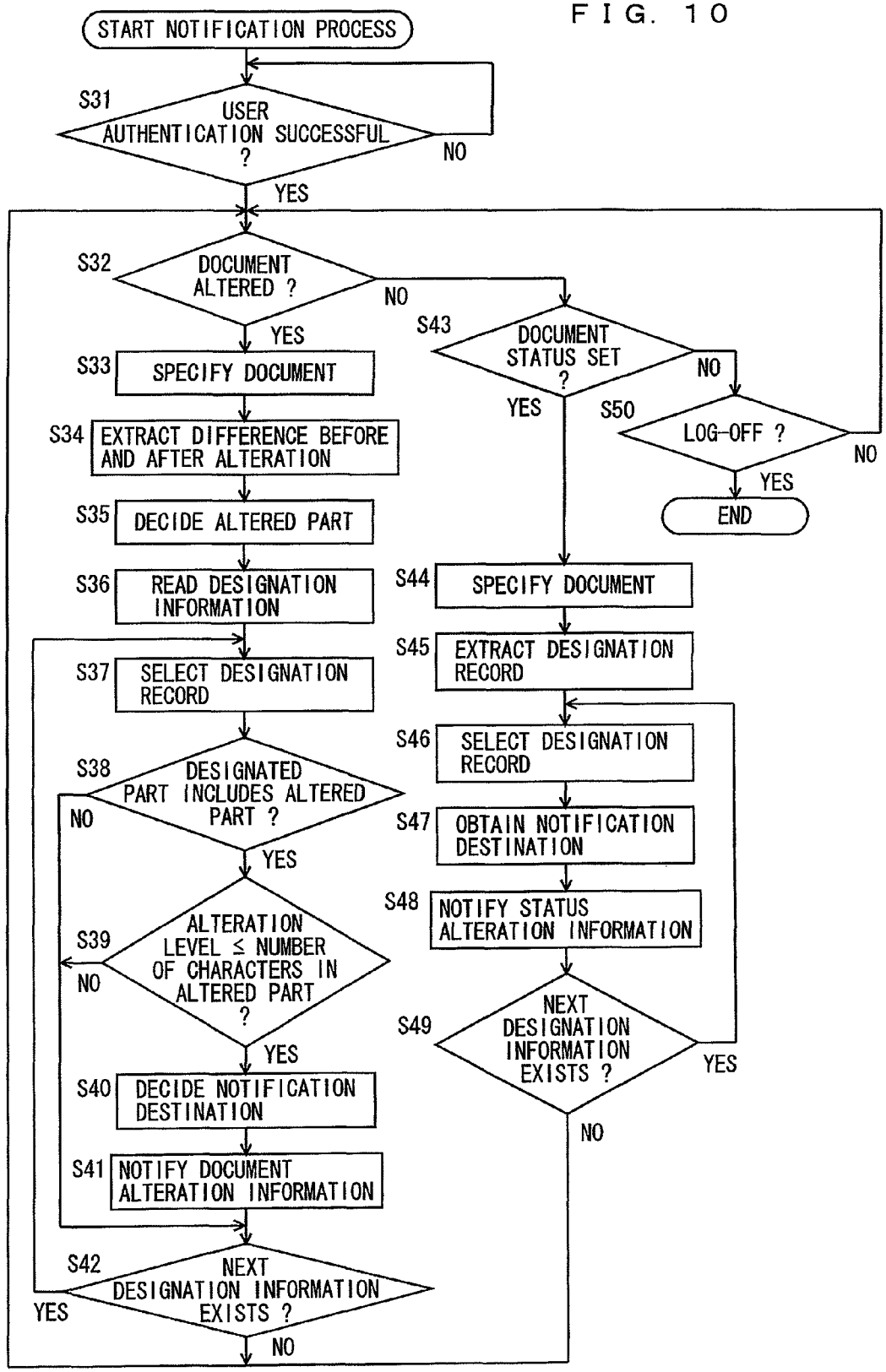
FIG. 10 is a flow chart showing one example of the flow of a notification process.

FIG. 10 is a flow chart showing one example of the flow of a notification process. The notification process is the process executed by CPU 111 when CPU 111 provided in MFP 100 executes a document management program stored in ROM 113 or memory card 119A. With reference to FIG. 10, CPU 111 determines whether the authentication of a user has been successful or not (step S31). The process stands by until the authentication of the user is successful (NO in step S31), and it proceeds to step S32 when the authentication of the user succeeds (YES in step S31).

In step S32, it is determined whether the document has been altered or not. If the document has been altered, the process proceeds to step S33, but if not, the process proceeds to step S43. In step S43, it is determined whether a document status has been set or not. If the document status has been set, the process proceeds to step S44, but if not, the process proceeds to step S50. In step S50, it is determined whether the operation to log-off has been accepted or not. If the operation to log-off has been accepted, the notification process is terminated, but if not, the process goes back to step S32. In other words, until the operation to log-off is accepted, the process of step S33 through step S42 is executed if the document has been altered, and the process of step S44 through step S49 is executed if the status of the document has been set.

In step S33, the document altered in step S32 is specified, and the process proceeds to step S34.

In step S34, the difference in the document specified in step S33 before and after the alteration is extracted, and the process proceeds to step S35. More specifically, the document prior to the alteration is compared with the document after the alteration and a part that differs before and after the alteration is extracted.

In step S35, the altered part is decided based on the difference extracted in step S34, and the process proceeds to step S36. More specifically, the part extracted as the difference between the two documents from before and after the alteration in step S34 is decided to be the altered part.

In step S36, designation information 163 stored in HDD 116 is read, and the process proceeds to step S37. In step S37, one of the designation records included in designation information 163 read in step S36 is selected to be the object of processing, and the process proceeds to step S38.

In step S38, it is determined whether the designated part of the designation record set to be the object of processing includes the altered part or not. If the designated part includes the altered part, the process proceeds to step S39, but if not, the process proceeds to step S42. More specifically, it is determined that the designated part of the designation record includes the altered part if the file name set in the column of the file name of the designation record set to be the object of processing is the same as the file name of the document specified in step S33 and if the range information set in the column of the range information of the designation record includes the altered part decided in step S35.

In step S39, it is determined whether or not the alteration level set in the column of the alteration level of the designation record set to be the object of processing is not greater than the number of characters in the altered part. If the alteration level is not greater than the number of characters in the altered part, the process proceeds to step S40, but if not, the process proceeds to step S42.

In step S40, the electronic mail address set in the column of the notification destination of the designation record set to be the object of processing in step S37 is decided to be the notification destination. In the next step S41, document alteration information is notified to the notification destination decided in step S40, and the process proceeds to step S42. More specifically, the electronic mail is generated whose destination address is the electronic mail address set in the column of the notification destination of the designation record set to be the object of processing and to which the altered document is attached, and the generated electronic mail is transmitted to an electronic mail server.

In step S42, it is determined whether or not a designation record exists which has not yet been set to be the object of processing among the designation records included in the designation information read in step S36. If an unprocessed designation record exists, the process goes back to step S37, but it does not exist, the process goes back to step S32.

In step S43, it is determined whether the document status has been set or not. If the document status has been set, the process proceeds to step S44, but if not, the process proceeds to step S50. More specifically, it is determined whether status table 165 stored in HDD 116 has been altered or not.

In step S44, the document which has the status set is specified, and the process proceeds to step S45. Among the status records included in status table 165, the file name of the status record in which the column of the status has been altered is obtained. In step S45, a designation record in which the file name of the document specified in step S44 is set in the column of the file name is extracted from designation information 163 stored in HDD 116.

In step S46, one of the designation records extracted in step S45 is selected as the object of processing, and the process proceeds to step S47.

In step S47, the electronic mail address which is set in the column of the notification destination of the designation record set to be the object of processing is obtained as the notification destination, and the process proceeds to step S48. In step S48, the fact that the status of the document has been altered is notified to the notification destination obtained in step S47, and the process proceeds to step S49. More specifically, the electronic mail is generated whose destination address is the electronic mail address set in the column of the notification destination of the designation record set to be the object of processing and which includes the file name of the document specified in step S44 and the status set in step S43, and the generated electronic mail is transmitted to an electronic mail server.

In step S49, it is determined whether or not a designation record exists that has not been set to be the object of processing among the designation records extracted in step S45. If an unprocessed designation record exists, the process goes back to step S46, but it does not exist, the process goes back to step S32.

In step S50, it is determined whether the operation to log-off has been accepted or not. If the operation to log-off has been accepted, the notification process is terminated, but if not, the process goes back to step S32.

As described above, in conference system 1 according to the present embodiment, MFP 100 that functions as a document management apparatus stores document 167 in HDD 116, accepts any part designated by a user within document 167 as a designated part, stores designation information 163 which associates the accepted designated part with a notification destination, and notifies the notification destination associated with the designated part when document 167 is altered and if at least a portion of an altered part altered is included in the designated part. Consequently, the user may designate any part for which the user desires to be notified in case an alteration is made thereto so that the user can set the part related to the user as the designated part. As a result, it becomes possible to make the notification only if the part related to the user is altered within the document.

In addition, the part that has been altered within the document is detected as the altered part based on the difference between document 167 after the alteration and document 167 prior to the alteration. Designation information 163 further associates the alteration level determined by the number of characters with the designated part, and the notification is made to the notification destination associated with the designated part provided that the number of characters included in the difference is not less than the number of characters determined by the alteration level associated with the designated part. As a result, it becomes possible not to make the notification of the alteration within the document if the number of characters is less than the number of characters determined by the alteration level.

Further, within the document designated by the presenter among documents 167, the part that includes one or more character strings selected from the character strings obtained by the recognition of the voice of the presenter is set to be the designated part, and the notification destination address associated by the address book with the user identification information of the attendant who is identified based on a voice other than the voice of the presenter is set to be the notification destination. Consequently, the designated part and the notification destination can be automatically decided based on the voices of two users.

Furthermore, when a new status is set in document 167, the fact that the status has been altered is notified to the notification destination associated with document 167 so that the change in the status of the document can be notified to the user specified by the notification destination at the moment the status of the document is altered. It becomes possible to notify the user of both the timing at which the content of the document is altered and the timing at which the status of the document is altered.

Moreover, although MFP 100 is described as one example of a document management apparatus in the present embodiment, it goes without saying that the present invention may be construed as a document management method to cause MFP 100 to execute the processes shown in FIGS. 8 to 10 or as a document management program to cause CPU 111 which controls MFP 100 to execute the document management method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A document management apparatus, comprising:
    a document storing portion to store a document on a memory;
    a designated part accepting portion to accept as a designated part any part designated by a user within the stored document;
    an associating portion to associate a notification destination with said designated part accepted, wherein the associating portion is configured to generate a designation record for each of a plurality of designated parts associated with notification destinations;
    an altering portion to alter said stored document;
    a notifying portion to notify said notification destination associated with said designated part when at least a portion of an altered part altered within said stored document by said altering portion is included in said designated part;

an address data storing portion to store address data that associates user identification information for identifying a user with a transmission destination address assigned to the user;

a designation accepting portion to accept designation of said stored document;

a voice accepting portion to accept a voice from outside;

a voice recognition portion to recognize the accepted voice; and a voice identification portion to identify a user based on said accepted voice, wherein said associating portion includes a designated part setting portion to set a part that includes one or more character strings selected from the voice recognized by said voice recognition portion to be a designated part within the document designated by said designation accepting portion among the stored documents, and a notification destination setting portion to set as said notification destination the transmission destination address associated with the user identification information of the user identified by said voice identification portion based on a voice other than the voice that became a subject of recognition by said voice recognition portion when said designated part setting portion sets said designated part.

2. The document management apparatus according to claim 1, further comprising an altered part detecting portion to detect a part that has been altered within said document as said altered part based on a difference between a document prior to an alteration and the document after the alteration by said altering portion, wherein said associating portion further associates an alteration level determined by number of characters with said designated part, and said notifying portion notifies said notification destination associated with said designated part provided that the number of characters included in said difference is not less than the number of characters determined by said alteration level associated with said designated part.

3. The document management apparatus according to claim 1, further comprising:

a status setting portion to set a status in said stored document; and a status notifying portion to notify said notification destination associated with said document that the status has been altered when a new status is set in said stored document by said status setting portion.

4. A document management method, comprising the steps of:

storing a document;

accepting any part designated by a user within the stored document as a designated part;

associating a notification destination with said designated part accepted, wherein a designation record is generated for each of a plurality of designated parts associated with notification destinations;

altering said stored document;

notifying said notification destination associated with said designated part when at least a portion of an altered part altered within said stored document is included in said designated part;

storing address data that associates user identification information for identifying a user with a transmission destination address assigned to the user;

accepting designation of said stored document;

accepting a voice from outside;

recognizing the voice accepted; and identifying a user based on the accepted voice, wherein said associating step includes the steps of setting a part that includes one or more character strings selected from the voice recognized in said step of recognizing the voice to be a designated part within the document designated in said step of accepting designation among the stored documents, and setting as said notification destination the transmission destination address associated with the user identification information of the user identified in said step of identifying the user based on a voice other than the voice that became a subject of recognition in said step of recognizing the voice when said designated part is set in said step of setting to be the designated part.

5. The document management method according to claim 4, further comprising the step of detecting a part that has been altered within said document as said altered part based on a difference between a document prior to an alteration and the document after the alteration made in said altering step, wherein said associating step includes a step of further associating an alteration level determined by number of characters with said designated part, and said notifying step includes a step of notifying said notification destination associated with said designated part provided that the number of characters included in said difference is not less than the number of characters determined by said alteration level associated with said designated part.

6. The document management method according to claim 4, further comprising the steps of:

setting a status in said stored document; and notifying said notification destination associated with said document that the status has been altered when a new status is set in said stored document in said step of setting the status.

7. A computer-readable non-transitory storage medium storing a document management program which causes a computer to execute the steps of:

storing a document;

accepting any part designated by a user within the stored document as a designated part;

associating a notification destination with said designated part accepted, wherein a designation record is generated for each of a plurality of designated parts associated with notification destinations;

altering said stored document;

notifying said notification destination associated with said designated part when at least a portion of an altered part altered within said stored document is included in said designated part;

storing address data that associates user identification information for identifying a user with a transmission destination address assigned to the user;

accepting designation of said stored document;

accepting a voice from outside;

recognizing the voice accepted; and identifying a user based on the accepted voice, wherein said associating step includes the steps of setting a part that includes one or more character strings selected from the voice recognized in said step of recognizing the voice to be a designated part within the document designated in said step of accepting designation among the stored documents, and setting as said notification destination the transmission destination address associated with the user identification information of the user identified in said step of identifying the user based on a voice other than the voice that became a subject of recognition in said step of recognizing the voice when said designated part is set in said step of setting the designated part.

8. The document management program according to claim 7, further causing a computer to execute the step of detecting a part that has been altered within said document as said altered part based on a difference between a document prior to an alteration and the document after the alteration made in said altering step, wherein said associating step includes a step of further associating an alteration level determined by number of characters with said designated part, and said notifying step includes a step of notifying said notification destination associated with said designated part provided that the number of characters included in said difference is not less than the number of characters determined by said alteration level associated with said designated part.

9. The document management program according to claim 7, further causing a computer to execute the steps of:

setting a status in said stored document; and notifying said notification destination associated with said document that the status has been altered when a new status is set in said stored document in said step of setting the status.

\* \* \* \* \*